(12) United States Patent
Glaser et al.

(10) Patent No.: US 9,937,909 B2
(45) Date of Patent: Apr. 10, 2018

(54) METHOD FOR OPERATING A BRAKE SYSTEM AND BRAKE SYSTEM FOR A MOTOR VEHICLE

(71) Applicant: Robert Bosch GmbH, Stuttgart (DE)

(72) Inventors: Markus Glaser, Sindelfingen (DE); Achim Eisele, Hessigheim (DE); Matthias Kranich, Grossbottwar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/104,874

(22) PCT Filed: Oct. 29, 2014

(86) PCT No.: PCT/EP2014/073218
§ 371 (c)(1),
(2) Date: Jun. 15, 2016

(87) PCT Pub. No.: WO2015/090701
PCT Pub. Date: Jun. 25, 2015

(65) Prior Publication Data
US 2016/0332609 A1    Nov. 17, 2016

(30) Foreign Application Priority Data
Dec. 20, 2013   (DE) .................. 10 2013 226 841

(51) Int. Cl.
*B60T 8/60*     (2006.01)
*B60T 8/1755*   (2006.01)
*B60T 13/00*    (2006.01)

(52) U.S. Cl.
CPC ..... *B60T 8/17555* (2013.01); *B60T 2270/304* (2013.01); *B60T 2270/413* (2013.01)

(58) Field of Classification Search
CPC .......... B60T 8/17555; B60T 2270/304; B60T 2270/413
See application file for complete search history.

(56) References Cited

U.S. PATENT DOCUMENTS 5,169,214 A * 12/1992 Holzmann .............. B60T 8/175
                                                303/113.2
6,182,001 B1 * 1/2001 Sugai ..................... B60T 8/885
                                                303/122

(Continued)

FOREIGN PATENT DOCUMENTS

| | | |
|---|---|---|
| CN | 1890141 A | 1/2007 |
| EP | 482379 | 4/1992 |
| JP | 2000038123 A | 2/2000 |

OTHER PUBLICATIONS

International Search Report dated Jan. 19, 2015 for PCT/EP2014/073218.

*Primary Examiner* — Melody M Burch
(74) *Attorney, Agent, or Firm* — Norton Rose Fulbright US LLP; Gerard Messina

(57) ABSTRACT

A method for operating a brake system in a motor vehicle, having at least one hydraulic circuit that has a hydraulic pump and at least two wheel brakes, at least one actuatable inlet valve being allocated to each wheel brake. The brake system is monitored for a driver's braking request. To acquire the driver's braking request, a first wheel behavior of at least one wheel allocated to one of the wheel brakes is acquired, such that, upon acquiring of an unexpected wheel behavior, the braking intervention is interrupted and a second wheel behavior of the wheel is acquired and compared to the first wheel behavior of the wheel, and the driver's braking request is recognized as a function of the comparison.

4 Claims, 1 Drawing Sheet

(56) References Cited

U.S. PATENT DOCUMENTS

| | | | | |
|---|---|---|---|---|
| 6,264,287 B1 * | 7/2001 | Sekihara | ............... | B60T 8/3275 303/10 |
| 2006/0043790 A1 * | 3/2006 | Spieker | .................. | B60T 8/885 303/122 |

* cited by examiner

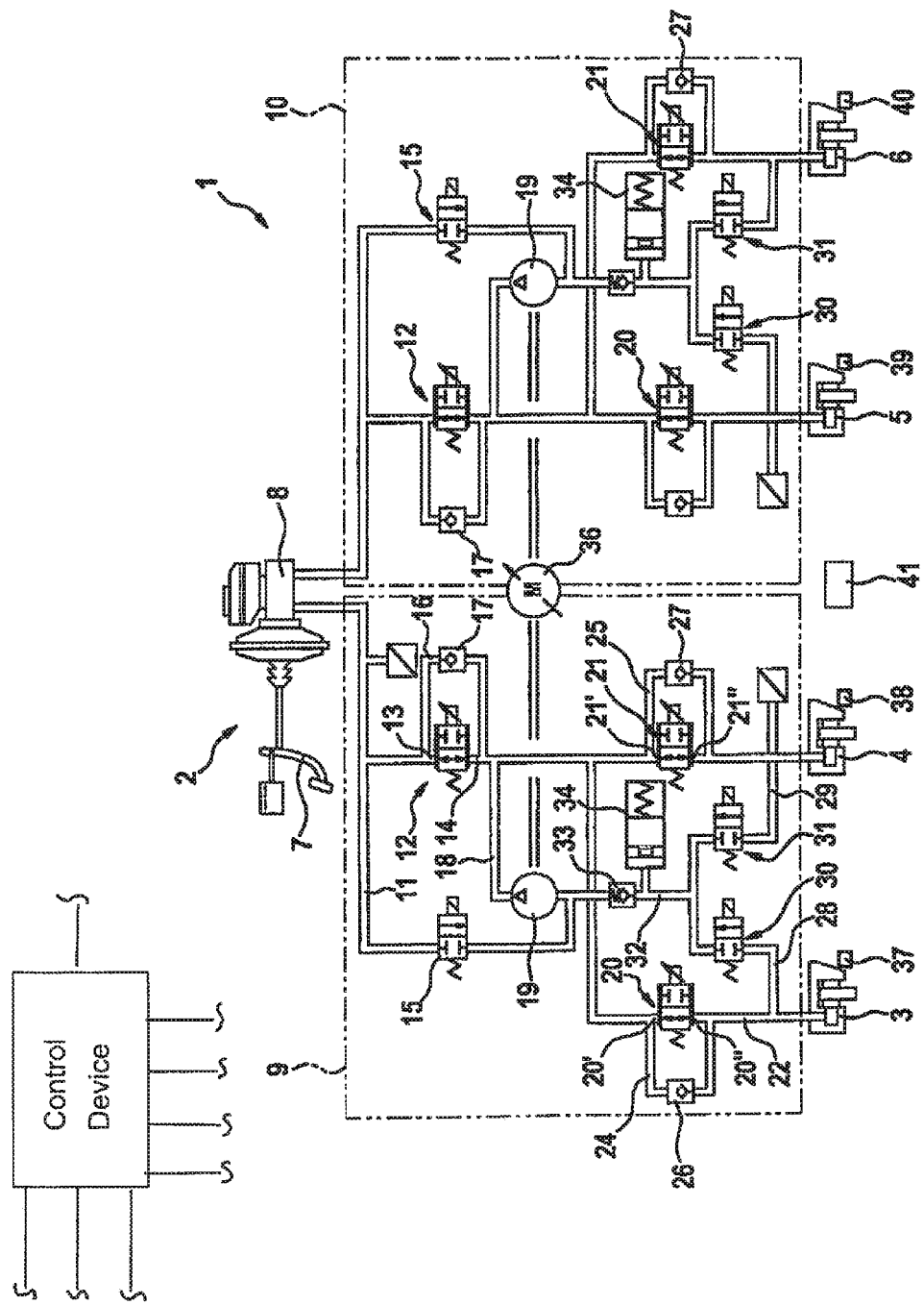

METHOD FOR OPERATING A BRAKE SYSTEM AND BRAKE SYSTEM FOR A MOTOR VEHICLE

FIELD

The present invention relates to a method for operating a brake system, in particular of a motor vehicle, having at least one hydraulic circuit that has a hydraulic pump and at least two wheel brakes, at least one actuatable inlet valve being allocated to each wheel brake, in which, for an automatic braking intervention, a pressure is produced in the hydraulic circuit by the hydraulic pump and the inlet valve of a first of the wheel brakes is opened and the inlet valve of a second wheel brake of the same hydraulic circuit is closed, the brake system being monitored for a driver's braking request.

In addition, the present invention relates to a corresponding brake system for a motor vehicle, having at least one hydraulic circuit that has a hydraulic pump and at least two wheel brakes, an actuatable inlet valve being allocated to each wheel brake, and having means for monitoring the brake system for a driver's braking request.

BACKGROUND INFORMATION

Modern motor vehicles are generally equipped with brake systems that carry out an automatic braking intervention in order to increase driving stability. Such systems have become known in particular under the designation ESP systems (ESP=Electronic Stability Program), which apply a braking pressure in a targeted fashion to one or more wheels of a motor vehicle using corresponding wheel brakes in order for example to prevent pulling of the motor vehicle. Conventionally, for this purpose, braking interventions for stabilization are carried out both on the front axle and on the rear axle. Generally, two wheel brakes are allocated to a hydraulic circuit, for example a wheel brake of a front axle and a wheel brake of a rear wheel axle. Conventionally, the automatic braking intervention for increasing driving stability is intended to actuate only one of the wheel brakes. Therefore, it is provided that the inlet valve of the wheel brake that is not to be actuated is closed, so that the pressure produced by the hydraulic pump does not act thereon. Conventionally, a corresponding hydraulic pre-pressure sensor is provided that acquires the pressure produced in the brake system by a driver. If the pre-pressure sensor is omitted, it can no longer be ascertained whether the driver has a desire to carry out a braking that is independent of the automatic braking intervention and is intended to be superposed on the automatic braking intervention.

SUMMARY

The method according to the present invention and the brake system according to the present invention may have an advantage that a driver's braking request is acquired even if a hydraulic pressure sensor is not present, and in this way a superposition of the driver's braking request on the automatic braking intervention is possible. According to the present invention, for this purpose the method provides that, to acquire a driver's braking request, a first wheel behavior at least of one wheel allocated to one of the wheel brakes is acquired, such that upon acquisition of an unexpected wheel behavior of the wheel the braking intervention is interrupted and a second wheel behavior at least of this wheel is acquired and is compared to the first wheel behavior, the driver's braking request being recognized as a function of the comparison. Through the interruption of the automatic braking intervention, all inlet valves are reopened, and are connected for example to a master brake cylinder, so that the brake pressure specified by the driver acts on the wheel brakes. If the wheel behavior of the wheels changes correspondingly while the braking intervention is interrupted, or if the previously acquired first wheel behavior is confirmed by the second wheel behavior, then according to the present invention it is recognized that a driver's brake request is present. As wheel behavior, in particular an acceleration and a rotational speed of the respective wheel is acquired and evaluated. In particular if a negative acceleration of a wheel, in particular below or above a specifiable boundary value, is acquired as first and/or second wheel behavior, it is recognized that a driver's brake request is present. The acceleration of the wheel is particularly preferably determined as a function of the acquired rotational speed.

According to an advantageous development of the present invention, it is provided that, if a comparison yields the result that the second wheel behavior corresponds at least substantially to the first wheel behavior, the brake modulation is adapted and continued as a function of the acquired second wheel behavior. Thus, if in the previously described step it was recognized that the second wheel behavior also indicates a driver's braking request, and in this way the first acquired wheel behavior is plausibilized, it is provided that the brake pressure modulation is adapted and continued. In the adaptation of the brake pressure modulation, in particular the driver's braking request is superposed on the automatic braking intervention, so that on the one hand the braking intervention is carried out and on the other hand the driver's braking request is taken into account.

In addition, it is preferably provided that, if the comparison yields the result that the second wheel behavior differs from the first wheel behavior, the braking intervention is continued unchanged. Thus, if during the interrupted braking intervention it is recognized that the first and the second wheel behavior differ from one another by a sufficient amount, it is then recognized that no driver's braking request is present. Correspondingly, the braking intervention is continued without modification, and in particular the inlet valve, opened in the meantime, is re-closed. The interruption of the braking intervention usefully takes place over a brief enough time duration that driving safety is not endangered.

In addition, it is preferably provided that the interruption of the braking intervention takes place only if the current driving situation permits this without increasing a safety risk. In particular, it is provided that the brief interruption of the braking intervention takes place at a time at which the advantages of the braking intervention with regard to driving dynamics have already been exploited, so that the brief interruption is not perceived by the driver of the vehicle, even if the suspicion that a driver's braking request is present is not confirmed by the second wheel behavior.

The braking system according to one embodiment of the present invention is fashioned without a hydraulic pressure sensor, i.e., without a pressure sensor in the hydraulic circuit, and has, as means, a specially designed control device for carrying out the method according to the present invention. That is, the control device is in particular connected to corresponding rotational speed sensors allocated to the wheels in order to monitor the wheel behavior of the wheels. In addition, the control device is usefully connected to the inlet valves and to the hydraulic pump in order to correspondingly control them. In this way, the advantages already named above result. Further features and advantages result from the previous description and from the claims.

In the following, the present invention is explained in more detail on the basis of an exemplary embodiment.

BRIEF DESCRIPTION OF THE DRAWINGS

The FIGURE shows a brake system, in a schematic representation.

DETAILED DESCRIPTION OF EXAMPLE EMBODIMENTS

The FIGURE shows, in a simplified representation, a brake system 1 of a motor vehicle (not shown in more detail here). Brake system 1 has a brake actuation device 2 that is hydraulically connected to a plurality of wheel brakes 3, 4, 5, 6. Brake actuation device 2 has for this purpose a brake pedal 7 that is connected to a master brake cylinder 8. Master brake cylinder 8 is connected to two hydraulic circuits 9 and 10, each connected to two of the wheel brakes 3 through 6. The two hydraulic circuits 9 and 10 are of identical design, and the design of the two hydraulic circuits 9 and 10 is explained in more detail in the following with reference to hydraulic circuit 9.

From master brake cylinder 8, a first line 11 of hydraulic circuit 9 leads to a changeover valve 12 fashioned as an electrically actuatable 2/2-way valve. For this purpose, changeover valve 12 has a first connection 13 connected to line 11, and a second connection 14. In a bypass 16 that leads from connection 13 to connection 14, a check valve 17 is situated that blocks in the direction of master brake cylinder 8.

Moreover, from connection 14 a line 18 leads to a pressure side of a hydraulic pump 19. A branch of line 18 moreover leads to an inlet valve 20 connected before wheel brake 3, and to an inlet valve 21 connected before wheel brake 4. The two inlet valves 20 and 21 are each fashioned as 2/2-way valves that are electrically actuatable. In the unactuated, or currentless, state, inlet valves 20, 21 are in a switching position in which line 18 is connected directly to wheel brakes 3, 4. A first connection 20', or 21', of the respective inlet valve is for this purpose connected to line 18, and a second connection 20'', or 21'', is connected to a line 22, or 23, leading to respective wheel brake 3 or 4. Moreover, a bypass 24, 25 is allocated respectively to inlet valves 20, 21, in which bypass there is respectively connected a check valve 26 or 27 that closes in the direction of wheel brakes 3, 4.

In addition, from lines 22, 23 a line 28 or 29 branches off that leads to a respective outlet valve 30 or 31. Outlet valves 30, 31 are also fashioned as 2/2-way valves that are electrically actuatable. Here, outlet valves 30, 31 are fashioned as currentlessly closed valves that therefore close a flow cross-section in the currentless state.

Downstream from outlet valves 30, 31, lines 28, 29 are combined to form a common line 32 that is connected to the intake side of hydraulic pump 19. Moreover, in line 32 a check valve 33 is provided that closes in the direction of outlet valves 30, 31, and a hydraulic pressure storage unit 34 is provided that can accommodate and emit hydraulic medium of brake system 1 as needed.

Moreover, between check valve 33 and hydraulic pump 19 a further line 35 branches off from line 32, and leads to a high-pressure switching valve 15. High-pressure switching valve 15 is connected to master brake cylinder 8 on the one hand with line 35 and on the other hand with line 11. High-pressure switching valve 15 is fashioned as a currentlessly closed 2/2-way valve.

As described above, hydraulic circuit 10 is fashioned corresponding to hydraulic circuit 9, and in the present exemplary embodiment the two hydraulic pumps 19 of hydraulic circuits 9 and 10 are driven by a common electric motor 36. Alternatively, of course, a realization is also possible in which hydraulic pumps 19 each have their own electric motor.

In normal operation, if a pressure is to be passively built up at wheel brakes 3 through 6 solely through the actuation of brake pedal 7, changeover valve 12, high-pressure switching valve 15, and inlet valves 20, 21 are switched currentless in such a way that the pressure produced by master brake cylinder 8 is conducted directly to wheel brakes 3 through 6. For this purpose, changeover valve 12 is also fashioned in such a way that in the currentless state it is in a first switching position in which line 11 and line 18, or connection 13, is connected to connection 14.

Wheel brakes 3, 4 and 5, 6 can each be allocated to the same axle of the motor vehicle, a front axle or a rear axle, or they can be allocated to different axles, so that for example wheel brakes 3 and 5 are allocated to the front axle and wheel brakes 4 and 6 are allocated to the rear axle of the motor vehicle. When there is an ESP stabilization braking intervention, through activation of hydraulic pumps 19 by electric motor 36 a pressure is produced in the respective hydraulic circuit 9, 10, and, in order to apply a braking process at only one of the wheels to stabilize the motor vehicle, at least one of inlet valves 20 or 21 of the corresponding brake circuit 9 and/or 10 is supplied with a flow and is thereby closed, so that the braking intervention takes place only via one of the wheel brakes of a hydraulic circuit. Here, flow also takes place to changeover valve 12, so that the produced pressure does not escape into master brake cylinder 8. Outlet valves 30 and 31 are also closed. A brake pressure modulation for the stabilizing intervention is achieved through changeover valve 12 and a corresponding pressure controlling, also using hydraulic pumps 19. In particular, changeover valve 12 is fashioned as a proportional valve that can set a corresponding pressure difference via changeover valve 12. In particular, this pressure difference is continuously set, and in this way a continuous wheel brake pressure is also set at the actuated wheel brake. In this way, a precise wheel brake pressure regulation, or brake pressure modulation, is achieved for metered stabilizing interventions. Because in this way in a brake circuit 9 or 10 one of the wheel brakes 3 or 4, or 5 or 6, cannot be actuated by closed inlet valve 20 or 21, these are decoupled from the driver. This is always the case, independent of the partitioning of the brake circuit to the front and rear axle.

Brake system 1 is not equipped with a hydraulic pressure sensor that could acquire the pressure in master brake cylinder 8 and thus a driver's braking request. Thus, if the driver actuates brake pedal 7, the wheel brake not actuated by the automatic braking intervention cannot react to the driver's requested braking.

Therefore, it is advantageously provided that in addition a sensor 37, 38, 39, and 40 is allocated to each of the wheels of the motor vehicle, the sensor monitoring a behavior of the respective wheel. In particular, sensors 37 through 40 are fashioned as rotational speed sensors that, on the basis of the rotational speed curve or an acceleration acquired on the basis of the rotational speed curve, ascertain the wheel behavior of the wheel allocated to the respective wheel brake 3 through 6. For this purpose, sensors 37 through 40 are connected to a control device 41 (here only indicated) of brake system 1, which correspondingly evaluates the data and in particular controls brake system 1. Sensor 37 through 40 represent, together with control device 41, so-called observers for acquiring the wheel behavior. If one of the observers, or control device 41, determines an unexpected wheel behavior, then the suspicion exists that the driver is braking, or is indicating a driver's braking request through actuation of brake pedal 7. In order to confirm this suspicion, or to confirm the acquired first wheel behavior, the braking intervention is now terminated, for example at the rear axle or in brake hydraulic circuit 10. In this way, depending on the connection pattern of the brakes, a complete brake circuit becomes passive, i.e., all valves of this brake circuit 9 or 10 no longer receive flow, and in this way the possible driver's braking request from master brake cylinder 8 can act unhindered on wheel brakes 3, 4 or 5, 6 of the corresponding brake circuit 9 or 10. At this moment, the wheel behavior at least of the wheel whose first wheel behavior indicated a braking process by the driver is further acquired and is compared to the first wheel behavior. If no driver's braking request is present, then the initial suspicion is not confirmed, because the second wheel behavior is not set corresponding to the first wheel behavior or to a wheel behavior that is to be expected. The braking intervention is then further continued, in that flow again correspondingly takes place to the valves as described above.

However, if a driver's braking request is present, then a particular second wheel behavior is set at at least the one wheel, and the previously ascertained suspicion is confirmed, because for example the second wheel behavior agrees with the first wheel behavior, for example if the first wheel behavior and the second wheel behavior both show a reduction in rotational speed, or a negative acceleration.

Through this information concerning the driver's braking request, the brake pressure modulation is adapted in such a way that the driver's braking request is superposed on the previously produced brake pressure modulation. Here, the magnitude of the driver's braking request, i.e., the requested braking torque, can be determined, for example as a function of the acquired second wheel behavior, in particular the acquired acceleration. Correspondingly, the brake pressure modulation, or the braking intervention, is adapted through the driver's braking request torque through corresponding actuation of the respective valve system, so that well-metered stabilizing interventions are possible, or ensured, despite the presence of a driver's braking request, and without the presence of a pressure sensor.

The brief termination of the braking intervention in respective brake circuit 9 or 10 usefully always takes place at a time at which the advantages of the intervention with regard to driving dynamics have already been exploited. Therefore, the brief termination of the braking intervention is not perceived by the driver, even if the suspicion relating to the first wheel behavior is not confirmed.

Overall, in this way a brake system 1 is offered that permits optimal vehicle-stabilizing braking interventions at the front and at the rear axle using a system not having a pressure sensor, without there being differences noticeable by the driver from a system having a pre-pressure sensor. Even during a braking intervention, the driver is not "decoupled" from the wheel brakes, because, due to the observed wheel behavior, a driver's braking request can be recognized quickly and reliably.

What is claimed is:

1. A method for operating a brake system of a motor vehicle, the brake system including at least one hydraulic circuit that has a hydraulic pump and at least two wheel brakes, at least one actuatable inlet valve being allocated to each wheel brake, in which, for an automatic braking intervention, a pressure is produced in the hydraulic circuit by the hydraulic pump and the inlet valve of a first of the wheel brakes is opened and the inlet valve of a second of the wheel brakes of the same hydraulic circuit is closed, the method comprising:
   monitoring the brake system during the automatic braking intervention in order to detect if a driver's braking request is initiated during the automatic braking intervention, wherein to detect the driver's braking request, performing:
      acquiring during the automatic braking intervention a first wheel behavior of at least one wheel allocated to one of the wheel brakes; and
      upon determining that the first wheel behavior is unexpected:
         implementing a temporary interruption of the automatic braking intervention,
         during the temporary interruption of the automatic braking intervention, acquiring a second wheel behavior of the wheel,
         during the temporary interruption of the automatic braking intervention,
         comparing the second wheel behavior to the first wheel behavior of the wheel, and
         if the comparison indicates that the driver's braking request has not been implemented, restoring the automatic braking intervention after ending the temporary interruption.

2. The method as recited in claim 1, wherein if the comparison yields the result that the second wheel behavior corresponds at least substantially to the first wheel behavior, adapting a brake pressure modulation and continuing as a function of the acquired second wheel behavior.

3. The method as recited in claim 1, wherein the comparison indicates that the driver's braking request has not been implemented, if the comparison yields the result that the second wheel behavior differs from the first wheel behavior.

4. A brake system for a motor vehicle, comprising:
   at least one hydraulic circuit that has a hydraulic pump and at least two wheel brakes, at least one actuatable inlet valve being allocated to each wheel brake, and having an arrangement for acquiring a driver's braking request, wherein the brake system is fashioned without a pressure sensor, and the arrangement includes a control device that monitors the brake system during an automatic braking intervention in order to detect if a driver's braking request is initiated during the automatic braking intervention, wherein to acquire the driver's braking request, the control device:
   acquires during the automatic braking intervention a first wheel behavior of at least one wheel allocated to one of the wheel brakes, and
   upon determining that the first wheel behavior is unexpected:
      implements a temporary interruption of the automatic braking intervention,
      during the temporary interruption of the automatic braking intervention, acquires a second wheel behavior of the wheel,
      during the temporary interruption of the automatic braking intervention, compares the second wheel behavior to the first wheel behavior of the wheel, and
      if the comparison indicates that the driver's braking request has not been implemented, restores the automatic braking intervention after ending the temporary interruption.

* * * * *